D. TURNER.
FABRIC MEASURING AND COST COMPUTING MACHINE.
APPLICATION FILED JULY 21, 1919.

1,392,723.

Patented Oct. 4, 1921.

INVENTOR
Douglas Turner.
BY
Elliott & Ammen
his ATTORNEYS

D. TURNER.
FABRIC MEASURING AND COST COMPUTING MACHINE.
APPLICATION FILED JULY 21, 1919.

1,392,723.

Patented Oct. 4, 1921.
4 SHEETS—SHEET 3.

Inventor
Douglas Turner
by Elliott Amner
his Attys.

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF MISSOURI.

FABRIC-MEASURING AND COST-COMPUTING MACHINE.

1,392,723. Specification of Letters Patent. Patented Oct. 4, 1921.

Application filed July 21, 1919. Serial No. 312,239.

*To all whom it may concern:*

Be it known that I, DOUGLAS TURNER, a citizen of the United States, residing in the city of St. Louis and State of Missouri, have invented new and useful Improvements in Fabric-Measuring and Cost-Computing Machines, of which the following is a specification.

This invention relates to machines for measuring the length of fabric and for computing the cost of the fabric measured, though certain features of this invention may be used in mechanisms for other specific purposes. Such machines are used largely in selling fabric, such as cloth, ribbons, etc., from the bolt or roll, but they are also used sometimes for measuring remnants. When used for measuring fabrics from a bolt or roll, the machine measures the exact length of the piece to be cut off, but when used for measuring a remnant, an inaccuracy would occur, unless provided for, due to the fact, that when the fabric is introduced into the machine for measurement, it is held with its forward end located near that wall of the machine which is beyond and at a distance from the measuring roller; this is necessary in order to give the operator of the machine sufficient fabric to seize, in pulling the remnant through the machine; consequently this piece of the fabric, from the wall of the machine to the roller does not become measured. To provide for this, it is necessary to add this distance, or length to every remnant that is measured. In the type of machine to which I have applied my invention, this amount of error to be corrected is about one inch.

The general object of the invention is to provide means for insuring that a machine shall be properly operated, and to provide a machine of this kind with means whereby it can be made to indicate the exact length of a remnant measured on the machine; in accomplishing this result I have endeavored to produce a mechanism which is automatic in operation and which operates in such a way that no mistake or confusion can result in operating the machine to measure pieces from a bolt or roll, or in measuring remnants. In the embodiment of the invention described in the following specification, I provide a manually operated depressible part which is adapted to be depressed when the machine is to be used for measuring a remnant, and the actuation of this part will automatically prevent the machine from being used in the regular way to measure lengths of goods from the bolt or roll; in other words, the mechanism is so constructed, that it is what is popularly called "fool-proof"; that is to say, the machine is so constructed that it cannot be operated in such way as to give an incorrect reading, in either of the uses of the machine.

Further objects of the invention will appear hereinafter.

The invention consists in the novel features, and in the general combination of parts to be particularly described hereinafter, all of which may contribute to produce a simple and efficient fabric measuring and cost computing machine. A preferred embodiment of my invention will be particularly described in the following specification, while the broad scope of my invention will be pointed out in the appended claims.

In the drawing,

Fig. 1$^a$ shows a modified form of the brake arm and of the collar that coöperates with the brake-shoe.

Fig. 1$^b$ is a section taken on line 1$^b$—1$^b$ on Fig. 2.

Fig. 1, is taken as shown by section line 3—3 in Fig. 2;

Fig. 9 is a side elevation of the machine broken away to illustrate further details.

Referring more particularly to the parts, the machine comprises a housing or casing 1, comprising a substantially cylindrical portion 2, and a substantially rectangular portion 3, in the former of which a dial is provided, the rectangular portion being provided with windows 4, through which the readings of the indicating charts may be observed. In the lower part of the machine, and just above a base-plate 5, there is mounted a measuring roller 6 (see Fig. 6), and with this measuring roller, coöperates a presser roller 7, which presses the goods or fabric against the upper face of the measuring roller when the fabric is being pulled through the machine.

The indicating mechanism of the machine preferably comprises a dial 8, including a scale 9, divided into large divisions indicating yards and into small divisions indicating inches. Over this dial two pointers rotate, one of which is a slow-moving pointer 10, the other being a fast-moving pointer 11, to indicate inches.

The indicating mechanism also includes two indicating charts 12 and 13, (see Fig. 6); these charts are normally wrapped upon a drum 14, but their upper ends are attached to the faces of rollers 15 and 16, so that when the charts wind onto the rollers, their faces are presented just below windows 4, and alongside of scales 17, which indicate various lengths of fabrics; the charts bear numbers, such as the numbers 18 which are in alinement with the numbers of the scales 17, and indicate the charge to be made to the customer for the length of fabric indicated in the scale.

Figure 5:
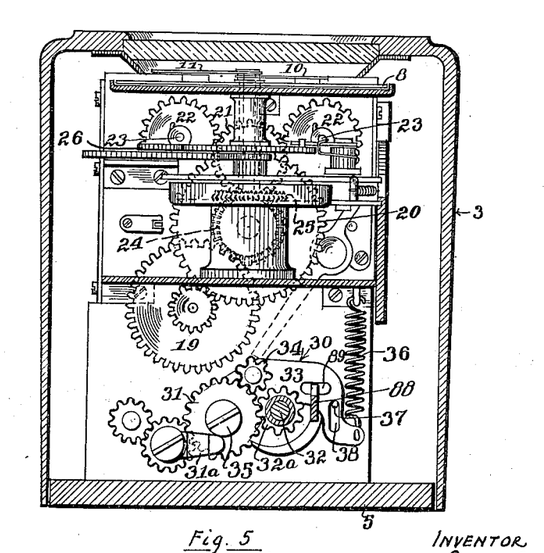
Fig. 5 is a vertical transverse section through the machine.
Figure 6:
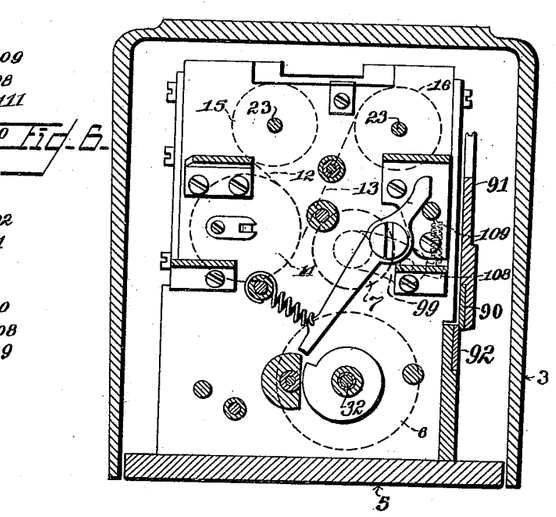
Fig. 6 is also a vertical transverse section through the machine, and this view particularly illustrates the arrangement of the rollers that carry the indicating charts.

Any suitable driving mechanism may be provided for driving the drums and for rotating the hands or pointers 10 and 11. Referring particularly to Figs. 5 and 6, the driving mechanism may comprise a large gear-wheel 19, which drives a gear-train indicated by the numeral 20, said train of gears including an idle gear 21 which meshes with two gear-wheels 22 which are rigidly attached to the shafts 23 of the two rollers 15 and 16.

There is also provided a branch gear-train leading to the pointers, including two bevel gears 24 and 25, and a reduction gear 26 which operate to rotate the aforesaid pointers or hands 10 and 11. (See Fig. 5.)

Figure 7:
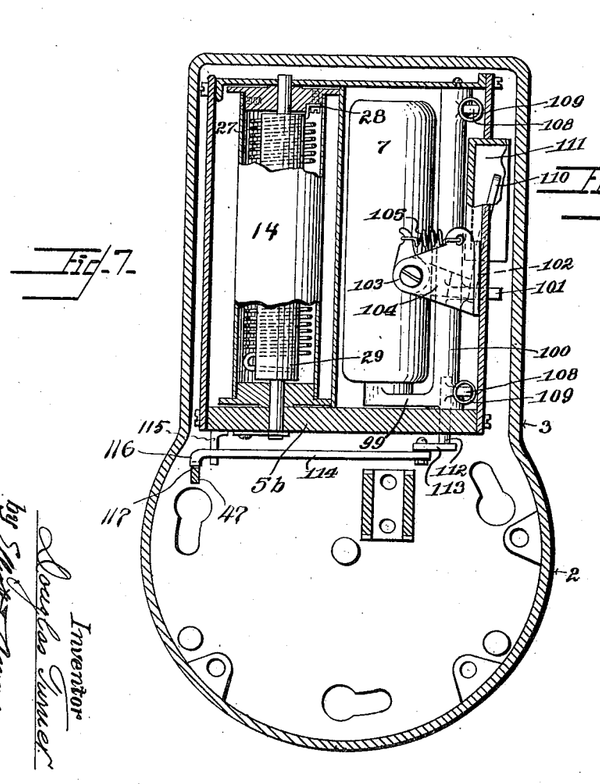
Fig. 7 is a horizontal section through the machine, particularly illustrating the mounting of the drum on which the charts wind, and also illustrating the construction of the presser roller.

I provide means for returning the charts 12 and 13 and the pointers 10 and 11 to their zero position after a measurement has been made, and this means preferably consists of a spring 27 (see Fig. 7) which is attached at its end 28 to the head of the drum, the other end of the spring being attached to a fixed arbor 29 disposed within the drum. When the charts are wound onto the rollers 15 and 16, this spring is placed in increased torsion; while the driving mechanism is connected with the measuring roller, the spring will not operate to return the indicating mechanism to the zero position, but I provide means for opening or disconnecting the driving connection from the measuring roller to the driving mechanism, in order to permit the indicating mechanism to be returned to zero. Any suitable means may be employed for effecting this result. This mechanism is preferably in the form of a special clutch-device or clutch mechanism 30, (see Fig. 5) consisting of a gear-wheel 31, which is driven by a pinion $32^a$ on the shaft 32 of the measuring roller. On the screw-headed stud 35 of gear 31 is loosely mounted a rocking-plate 33 carrying a pinion 34 meshing with the gear-wheel 31.

In order to insure that the spring 27 will not return the indicating mechanism to zero until this is desired, I provide a leaf spring $31^a$ (see Fig. 5), that presses against the side of gear-wheel 31, having the effect of a friction-brake.

When the machine is measuring, the pinion 34 meshes with the gear-wheel 19, but when the measuring operation is completed, the plate 33 is rocked on the axis of the stud 35 so as to disengage 34 from the gear 19. The clutch-device, however, is normally held closed by means of a spring 36, the lower end of which is attached to the end of the rocking-plate 33. The movement of the rocking-plate is limited by means of a fixed pin 37 which passes through a slot 38 in the plate 33.

Any desired means may be employed for increasing the reading of the indicating mechanism at the scales 9 and 17, when a remnant is to be measured; this may be accomplished in a variety of ways, for example. In any case, I provide a manually operated depressible part which is adapted to be "set" or actuated when the machine is to be used for measuring a remnant, and the mechanism of the machine is provided with means whereby the depression of this depressible member will effect an increase in the reading of the indicating mechanism. In the present instance I prefer to effect this result by employing a differential mechanism, one side of which is driven by the measuring roller and the other side of which is driven by the aforesaid depressible part or by mechanism actuated by the depression of the depressible part.

Figure 1:
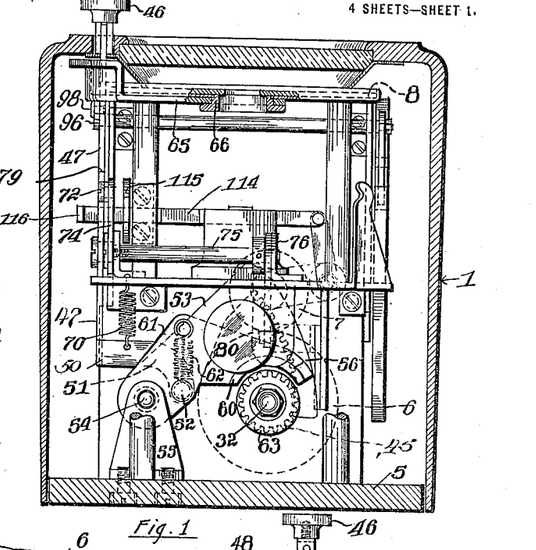
Figure 1 is a vertical cross section through the dial of the machine and at right angles to the longitudinal axis of the housing of the machine; this section is taken on the line 1—1 of Fig. 2.
Figure 1A:
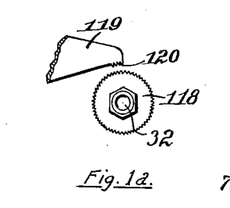
Figure 1B:
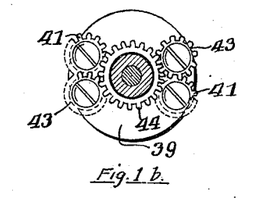
Figure 2:
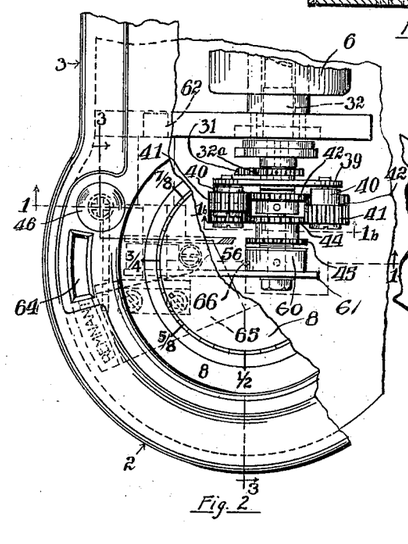
Fig. 2 is a plan showing a portion of the dial and with certain parts broken away to illustrate details of the mechanism.

Referring particularly to Fig. 2, this differential mechanism comprises a differential wheel 39 which is loosely mounted on the shaft 32 of the measuring roller and the hub of this differential wheel 39 carries the aforesaid pinion 32ª. The differential wheel 39 carries a pair of diametrically opposite studs 40, and each of these studs carries a driving pinion 41, one end of which meshes with a driving gear 42 which is rigidly attached to the shaft 32 on the measuring roller. In addition to the pinions 41, the differential wheel 39 carries two diametrically opposite pinions 43 Fig. 1ᵇ which are carried on studs similar to the studs 40, but these pinions mesh with a gear-wheel 44 which is loose on shaft 32.

The gear-wheel 42 may be considered as driving one side of this differential, while the gear-wheel 44, which is loose on the shaft 32, is for driving the other side of the differential. The pinions 41 and 43 are of equal diameter and mesh together in an overlapping relation, so that a differential mechanism results. The drive through the differential from the measuring roller 6, is effected as follows:

When the shaft 32 rotates, the gear-wheel 42 rotates the pinions 41 that mesh with it, and they in turn rotate the pinions 43. As the gear-wheel 44 with which the pinions 43 mesh, is stationary, a planetary motion of the pinions occurs around the periphery of the gear-wheel 44, thereby producing a rotation of the differential wheel 39.

The drive from the other side of the differential is effected in a similar way by rotating the gear 44, while the gear-wheel 42 is held fixed. If this is done, it is evident that a similar planetary movement of the pinions 41 and 43 will occur, producing a rotation of the differential wheel 39. In order to effect the rotation of the gear-wheel 44 when it is desired to increase the reading of the indicating mechanism, the gear-wheel 44 is rigid with the pinion 45, the same being connected to it by a collar. In order to rotate the pinion 45 when a remnant is to be measured, I provide a manually operated depressible part 46 which may be called the "Remnant button." This button is attached to the upper end of a vertical stem 47 which is guided through an opening in the cover wall 48 (see Fig. 3), the lower end of this stem being guided through a horizontal guide plate 49. The lower end of the stem 47 is formed with a laterally extending arm 50, which arm is bent at right angles to form a downwardly curved extension 51, (see Fig. 1), the end of which extension is attached by pivot 52 to a sector 53 pivotally mounted at 54, on a suitable bracket 55. This sector 53 is provided with a toothed quadrant 56; which is constantly in mesh with the teeth of the pinion 45 (see Figs. 1 and 2). Now, when the remnant button is depressed, it rocks the sector 53 and the toothed quadrant 56 will rotate the pinion 45, thereby actuating the indicating mechanism through the differential mechanism.

When the depressible part or remnant button is advancing the indicating mechanism in this way, it is of course necessary to hold the other side of the differential mechanism against rotation; this is accomplished in any suitable manner by means of a brake-shoe 60 which is carried on a brake-arm 61, pivotally mounted on the shaft 54, and a spring 62 connects the pin 52 with the brake-arm 61, so that when the remnant button is depressed, the brake will be yieldingly and resiliently pulled down toward the shaft 32 of the measuring roller. When the brake-shoe 60 is pulled down in this way it comes against a collar 63, which is rigidly attached to the shaft 32 (see Figs. 1 and 2).

I provide indicating means for indicating whether the machine is set for measuring a remnant; for this purpose the upper wall 48 of the machine is provided with a window 64 (see Fig. 2), beneath which there is provided an arm 65 pivotally mounted at 66 (Fig. 1) at the center of the dial. This arm 65 has a downwardly extending dog 67 (Fig. 3) which is engaged by the upper arm of the bell crank lever 68, the other arm of which is pivotally attached at 69 to the side of the stem 47. The outer end of the arm carries the word "Remnant," and when the button 46 is depressed the word "Remnant" is swung into view in the window 64. I prefer to provide automatic means for locking the depressible member or remnant button 46 against return when it has been depressed. In this connection it should be understood that a spring 70, (see Fig. 1) is attached to the extension 51 of the stem 47 and operates to return button 46 to its normal elevated position. When the remnant button 46 is depressed, it is automatically locked or latched in a depressed position by means of a pin 71 which extends laterally from the slide-bar 72 (see Fig. 3), the outer end of which slide-bar is guided in a suitable guide 73. This bar 72 is actuated by a vertical arm 74 attached to a stub-shaft 75 mounted on a suitable bracket 76 supported on the aforesaid frame plate 49. The stub-shaft 75 is provided with a downwardly extending dog 77 to which a spring 78 is attached, said spring tending to move the pin 71 toward the stem 47. The stem 47 has a shoulder 79 and when this shoulder passes below the pin 71, the spring 78 operates to move the pin 71 over the shoulder, thereby locking the remnant button 46 against return.

I provide manually operable means for effecting the release of the stem 47 from the pin 71; for this purpose I provide a manually operated member in the form of a thumb-plate 80 in the side wall of the housing (see Fig. 3), said thumb-plate being attached to a horizontal flat stem 82, the outer end of which is guided to slide in a bracket 83. The inner end of this flat stem 82 is pivotally attached at 84 to an arm 85, which arm is attached to a short rock-shaft 86, mounted in the lower part of the housing. The side of the stem 82 carries a pin 87, and when the thumb-plate is moved in, this pin 82 strikes the dog 77 and thereby moves the arm 74 to the right; (see Fig. 3) this withdraws the pin 71 from engagement with the shoulder 79.

I also utilize the thumb-plate 80 to effect the opening of the clutch mechanism 30, which has already been described above. In order to accomplish this, I simply provide the rock-shaft 86 with a pawl 88, and the end of this pawl engages a short slot 89 in the aforesaid rock-plate 33 (see Fig. 5). With this organization of parts, it is evident that the pawl 88 will operate to swing the rock-plate 33 downwardly and thereby disconnect the measuring roller from the driving train which drives the indicating mechanism.

I shall now describe the means for marking the fabric at the measured point where it is to be cut off after being drawn from the bolt or roll. This marking is preferably in the form of a movable cutter or knife 90, attached to a knife arm or lever 91 (see Figs. 3 and 6) said knife arm being pivotally mounted on bracket 92ᵃ (Fig. 9). The movable knife 90 coöperates with a fixed blade or knife 92 (see Fig. 6), and when the knife lever 91 is swung down, the blades 90 and 92 notch the edge of the fabric, in this way indicating the point where it is to be cut off.

Figure 3:
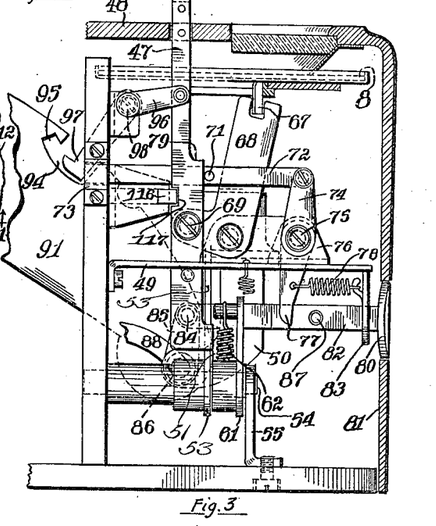
Fig. 3 is a vertical section through the machine in a plane substantially at right angles to the plane in which the section.
Figure 4:
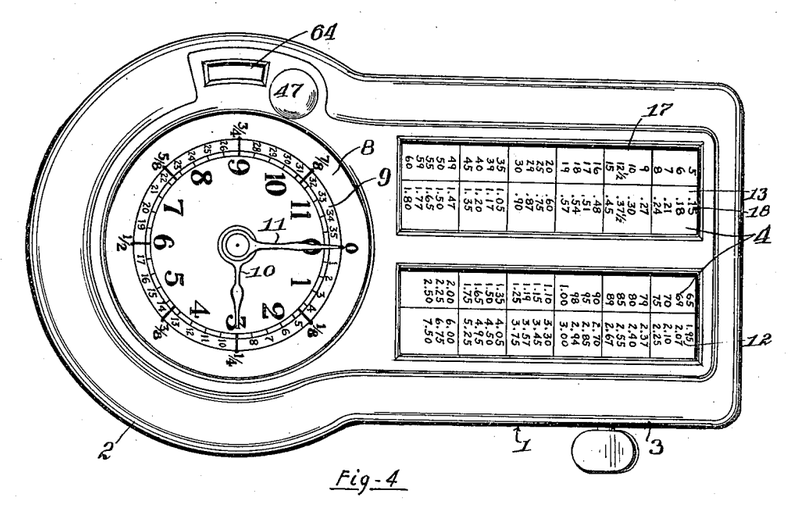
Fig. 4 is a plan of the machine.

Now, when the machine is to be used to measure a remnant the marking means should not be operated. In order to prevent any possibility of a careless operator operating the remnant button 46, when measuring fabric from the roll, and thereby getting a wrong measurement, I provide means for automatically locking the marking-means against operation if the remnant button has been depressed. This may be simply accomplished by any suitable means, for example, as illustrated in Fig. 3, I provide the back edge of the knife lever 91 with a deep notch 94 which is undercut laterally to form a side notch 95. When the stem 47 is depressed, an arm 96, which is pivotally attached to it actuates a hooked arm 97 which is rigid with a rock-shaft 98 which carries the arm 96; in this way, the hooked end of the arm 97 can be made to engage the side notch 95 and lock the knife lever 91 against operation.

Figure 8:
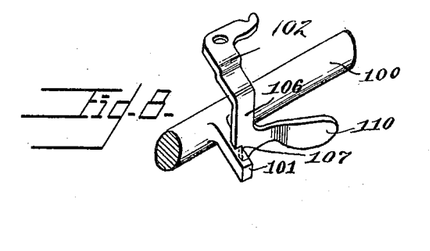
Fig. 8 is a perspective illustrating details of parts of the machine.

It may happen also, that a careless person operating the machine, might use the marking device after measuring a piece of fabric from the bolt or roll, and then, after having used the marking device, would depress the remnant button, and thereby produce an incorrect reading of the indicating mechanism. In order to prevent this from happening I provide means whereby the operation of the marking device will automatically lock the depressible part or remnant button against being depressed. Any suitable means may be employed for this purpose, but it should be controlled by the actuation of the marking means or knife lever 91. However, in machines of this type, it is customary to control the presser roller 7 automatically, by the operation of the marking-means, that is to say, when the knife is operated, the presser roller is automatically raised, and moved out of contact with the measuring roller, and is then held automatically in a position withdrawn from the measuring roller. I prefer to utilize the mechanism which effects this result, also for effecting the locking of the remnant button against being depressed. I have illustrated this mechanism in Figs. 1, 6, 7 and 8. Referring to these figures, the presser roller 7 is carried upon an arm 99 which extends outwardly from a rock-shaft 100 (see Fig. 7). This rock-shaft has a laterally extending arm 101 near its middle point (see Fig. 8) adjacent to which, at the side of the housing there is mounted a latch 102, which is pivoted at 103 on a suitable bracket 104. A spring 105 tends to hold the side of this latch up against the side of the arm 101. The latch has a downwardly projecting extension 106, the lower end of which is formed with a notch 107. Now, when the knife lever 91 is operated it engages the extremity of the arm 101 and swings the rock-shaft on its longitudinal axis, thereby raising the presser roller 7 into a withdrawn position away from the measuring roller. When the arm 101 is depressed, the latch 102 swings over it and holds it down automatically. The rock-shaft 100 is provided with short arms 108 (see Fig. 7), to which the springs 109 are attached, and these springs are attached in the frame at their upper ends (see Fig. 6) and tend to pull the presser roller 7 down against the measuring roller. These springs, of course, are extended when the presser roller 7 is latched in its elevated position. When it is desired to release the presser roller to permit it to come against the measuring roller, this is accomplished by pressing against the thumb-plate 110 which forms an extension from the lower end of the latch 102. This thumb-plate 110 is located in a pocket 111, formed in the side of the machine. Rock-shaft 100 has a co-axial stub-shaft 112 which extends through the vertical frame-plate 5ᵇ of the machine, and this stub-shaft 112 carries a rigid arm 113 to which there is attached a slide-bar 114 (see Figs. 1 and 7), the outer end of said slide-bar being guided in a suitable bracket 115. The end of this slide-bar has a laterally bent toe 116 and this toe lies adjacent to a notch 117 formed in the edge of the stem 47 (see Fig. 3). Now, when the presser roller 7 is held in its elevated position, or withdrawn position, the toe 116 occupies the notch 117 and thereby locks the remnant button 46 against being depressed.

Instead of employing a smooth collar 63 to coöperate with the brake-shoe 60, I may employ a serrated collar 118, (see Fig. 1ᵃ), and provide a specially constructed brake-arm 119, which is provided with teeth 120 which will engage the periphery of the wheel 118 when the brake-arm 119 is depressed. This gives a more positive action of the brake.

The mode of operation of the entire machine will now be briefly described:

When the machine is being used to measure fabric taken from a roll or bolt, the end of the fabric is positioned in the gap or opening of the machine (Fig. 9) between the measuring roller and the presser roller, and the presser roller is then released by operating the thumb-plate 110 and is pulled down upon the measuring roller by the springs 109 (see Figs. 6 and 7); the fabric is then pulled through the machine, thereby rotating the measuring roller 6, the rotation of which is imparted through the differential mechanism (see Fig. 2) to the differential wheel 39. The rotation of this differential wheel 39 rotates the pinion 32ᵃ and drives the gear-wheel 31 and the pinion 34 (Fig. 5) which normally meshes with the gear-wheel 19; the rotation of this gear-wheel 19 drives the pointers 10 and 11, and also drives the rollers 15 and 16 so that the charts 12 and 13 are wrapped upon the rollers 15 and 16. In this way the numbers at the windows 4 will indicate the charge to be made for the piece of goods measured, and the pointers 10 and 11 will indicate the length of the goods measured. The operator then actuates the knife lever 91 which operates to notch the edge of the fabric, thereby indicating the point where it is to be cut off.

When the machine is to be used to measure a remnant, the operator depresses the remnant button 46; when this occurs the extension 51 of stem 47 (see Fig. 1) operates through spring 62 to pull the brake-shoe 60 down against collar 63, thereby holding the shaft 32 of the measuring roller against rotation. The continued downward movement actuates the quadrant 56 to rotate pinion 45, and thereby drives the differential wheel 39 through the differential mechanism. This movement is sufficient to advance the indicating mechanism through one inch, or whatever is necessary to increase the measurement for measuring a remnant.

When the remnant button 46 is depressed, it actuates arm 96 (Fig. 3) which operates to swing the hooked arm 97 into engagement with notch 95 and this holds or locks the knife lever 91 against actuation.

If it is attempted to depress the remnant button while the presser roller is in its elevated position, that is to say, when withdrawn from the measuring roller, the depression of the remnant button will be prevented by the toe 116 on the slide-bar 114, (see Figs. 1, 3 and 7) that engages the notch 117 in the side of the stem 47. This will prevent the remnant button from being actuated immediately after the knife has been used to mark the fabric before being cut from the roll.

As the remnant button 46 is depressed, it is locked in its depressed position automatically by the bar 72 (see Fig. 3) actuated by the spring 78; the bar moves to the left so that pin 71 comes over the shoulder 79. The remnant button may be released at will by pushing in the thumb-plate 80 which rocks the dog 77 toward the left and thereby moves the bar 72 toward the right as shown in Fig. 3. This movement of the thumb-plate also operates to open the clutch connection from the measuring roller to the driving train at the gear-wheel 19 (see Fig. 5). This is effected by disconnecting the pinion 34 from the gear-wheel 19 by rocking-plate 33, and extending the spring 36. Opening the connection to the driving-train, permits the spring 27 (Fig. 7) to return the indicating mechanism to the zero position.

The depression of the remnant button also operates to rock the rocker-plate 68 (see Fig. 3) which operates through dog 67 to swing the signal-plate around, so that the word "Remnant" appears in the window 64.

The actuation of the knife lever 91 automatically sets the presser roller in its withdrawn position by reason of the fact that as the knife lever descends, it engages the arm 101, which extends from the rock-shaft 100 (see Figs. 8 and 9), and the latch 102 automatically locks the roller in its elevated position.

It is understood that the embodiment of the invention described herein is only one of the many embodiments my invention may take, and I do not wish to be limited in the practice of my invention nor in my claims, to the particular embodiment set forth.

What I claim and desire to secure by Letters Patent is:—

1. In a machine of the class described, for measuring lengths of fabric drawn from a bolt or roll, the combination of a measuring roller, indicating mechanism including a scale, means for driving the indicating mechanism from said measuring roller, and mechanism including an independent hand-actuated part, operated at will when a remnant is to be measured, for increasing the reading of the indicating mechanism at said scale.

2. In a machine of the class described, for measuring lengths of fabric drawn from a bolt or roll, the combination of a measuring roller, indicating mechanism including a scale, means for driving the indicating mechanism from said measuring roller, a manually operated part adapted to be actuated at will when a remnant is to be measured, and mechanism operated by said manually operated part for increasing the reading of the indicating mechanism at said scale.

3. In a machine of the class described, for measuring lengths of fabric drawn from a bolt or roll, the combination of a measuring roller, indicating mechanism including a scale, means for driving the indicating mechanism from said measuring roller, manually operated mechanism including a depressible part adapted to be actuated when a remnant is measured, for increasing the reading of the indicating mechanism at said scale, means for returning said depressible part to its normal position, and automatic means for locking said manually operated part against return.

4. In a machine of the class described, for measuring lengths of fabric drawn from a bolt or roll, the combination of a measuring roller, a presser roller coöperating therewith, indicating mechanism including a scale, means for driving said indicating mechanism from said measuring roller, a manually depressible part adapted to be depressed when a remnant is to be measured, means actuated thereby for increasing the reading of the indicating mechanism at said scale, means for returning said depressible part, automatic means for locking said depressible part against return after it has been actuated, and means for releasing said depressible part to permit the same to be returned.

5. In a machine of the class described, for measuring lengths of fabric drawn from a bolt or roll, the combination of a measuring roller, a pressure roller coöperating therewith, indicating mechanism including a scale, means for driving said indicating mechanism from said measuring roller, a manually depressible part adapted to be depressed when a remnant is to be measured, means actuated thereby for increasing the reading of the indicating mechanism at said scale, marking means for marking the fabric at the point where the same is to be cut off from the bolt or roll, and automatic means for locking said marking means against operation after said manually depressible part has been actuated.

6. In a machine of the class described, for measuring lengths of fabric drawn from a bolt or roll, the combination of a measuring roller, indicating mechanism including a scale, means for driving the indicating mechanism from said measuring roller, a depressible manually operated part adapted to be actuated when a remnant is to be measured, mechanism controlled thereby for increasing the reading of the indicating mechanism at said scale, marking means adapted to be used when the machine is used for measuring fabric drawn from a bolt or roll, means actuated by said manually operated part for locking said marking means against operation, to prevent operation of said marking means after the manually operated part has been depressed and means actuated by said marking means to lock said manually operated part against being depressed if the marking means is actuated when said manually operated part is in its normal elevated position.

7. In a machine of the class described, for measuring lengths of fabric drawn from a bolt or roll, the combination of a measuring roller, a presser roller coöperating therewith, indicating mechanism including a scale, means for driving said indicating mechanism from said measuring roller, a manually depressible part adapted to be depressed when a remnant is to be measured, means actuated thereby for increasing the reading of the indicating mechanism at said scale, marking means for marking the fabric at the point where the same is to be detached from the bolt or roll, automatic locking means for locking said marking means against operation after said depressible part has been actuated, automatic means for locking said depressible parts against return after it has been actuated and means for releasing said depressible part to permit the same to be returned and to release said marking means to permit the same to be operated.

8. In a machine of the class described, for measuring lengths of fabric drawn from a bolt or roll, the combination of a measuring roller, a pressure roller coöperating therewith, indicating mechanism including a scale, means for driving said indicating mechanism from said measuring roller, a manually operated part adapted to be depressed when a remnant is to be measured, means actuated thereby for increasing the reading of the indicating mechanism at said scale, marking means for marking the fabric at the point where the same is to be detached from the roll, and means actuated by the operation of said marking means for locking said depressible part against being depressed.

9. In a machine of the class described, for measuring lengths of fabric drawn from a bolt or roll, the combination of a measuring roller, a presser roller coöperating therewith, indicating mechanism including a scale, means for driving said indicating mechanism from said measuring roller, a manually depressible part adapted to be depressed when a remnant is to be measured, means actuated thereby for increasing the reading of the indicating mechanism at said scale, means for moving said presser roller away from said measuring roller, and means actuated by said last named means for locking said depressible part to prevent the same being depressed while said presser roller is withdrawn from said measuring roller.

10. In a machine of the class described, for measuring lengths of fabric drawn from a bolt or roll, the combination of a measuring roller, a presser roller coöperating therewith, indicating mechanism including a scale, means for driving said indicating mechanism from said measuring roller, a manually depressible part, adapted to be depressed when a remnant is to be measured, means actuated thereby for increasing the reading of the indicating mechanism at said scale, a knife for marking the fabric at the point where it is to be detached from the roll, means actuated by the operation of said knife to move said presser roller away from the measuring roller and hold the same in a position withdrawn from said measuring roller, and automatic means for locking said depressible part against being depressed while said presser roller is in its withdrawn position.

11. A machine constructed according to claim 8, in which the said depressible part is provided with a notch, and a member controlled by the marking means, engages the notch to lock the depressible part against return.

12. In a machine of the class described, for measuring lengths of fabric drawn from a bolt or roll, the combination of a measuring roller, a presser roller coöperating therewith, indicating mechanism including a scale, means for driving said indicating mechanism from said measuring roller, and a depressible manually operated part adapted to be depressed when a remnant is to be measured, mechanism actuated thereby for increasing the reading of the indicating mechanism at said scale, a rocker shaft carrying said presser roller for moving said presser roller against or away from said measuring roller, and means connected with said rocker shaft and actuated thereby for locking said depressible part against being depressed.

13. In a machine of the class described, for measuring lengths of fabric from a bolt or roll, the combination of a measuring roller, a presser-roller coöperating therewith, indicating mechanism including a scale, driving mechanism to drive said indicating mechanism from said measuring roller, a depressible manually operated part adapted to be depressed when a remnant is to be measured, said depressible part operating to actuate said driving mechanism to advance the indicating mechanism and thereby increase the reading at the scale, means for automatically locking said depressible part against return after the same has been depressed, and a manually operated member for releasing said last named means to permit the same to return to its normal position, clutch mechanism actuated by said last named member to disconnect the indicating mechanism from the measuring roller, and automatic means for returning the indicating mechanism to the zero position.

14. A machine constructed according to claim 13, in which the clutch mechanism comprises a rocking-plate, a driving gear rotating on the axis of rotation of the rocking-plate, a gear carried by the rocking-plate meshing with the last named gear, and a gear in the driving mechanism adapted to be engaged by the second named gear.

15. In a machine of the class described, for measuring lengths of fabric drawn from a bolt or roll, the combination of a measuring roller, indicating mechanism including a scale, a differential mechanism through which said measuring roller drives said indicating mechanism, a depressible manually operated part adapted to be depressed when a remnant is to be measured and means actuated thereby for actuating said differential mechanism to advance the indicating mechanism and increase the reading at said scale.

16. In a machine of the class described, for measuring lengths of fabric drawn from a bolt or roll, the combination of a measuring roller, a differential mechanism driven at one side by said measuring roller, indicating mechanism driven by said differential mechanism, a depressible manually operated part adapted to be depressed when a remnant is to be measured, and means actuated thereby for driving the other side of said differential mechanism to advance the indicating mechanism and increase the reading at said scale.

17. A machine constructed according to claim 16, combined with means actuated by said depressible part for automatically holding the measuring roller against rotation while the indicating mechanism is being advanced by the actuation of the depressible part.

18. In a machine of the class described, for measuring lengths of fabric drawn from a bolt or roll, the combination of a measuring roller, a presser roller coöperating therewith, a marking device to be used when the machine is being employed for measuring pieces drawn from a bolt or roll, a depressible part adapted to be depressed when the machine is to be used for measuring a remnant, indicating mechanism actuated by said measuring roller, means for increasing the reading of said indicating mechanism actuated by the depressing of the said depressible part, automatic means for withdrawing the presser roller from the measuring roller when said marking means is actuated, means for holding the presser roller in a position withdrawn from said measuring roller, an arm mounted so as to be actuated when the presser roller is withdrawn from said measuring roller, and means actuated by said arm for locking said depressible part against being depressed.

19. In a machine of the class described, for performing a regular operation, the combination of indicating mechanism including continuously visible scales, a depressible member, and means operated by said member to change the reading of the indicating mechanism for adapting the mechanism of the machine to a special operation, and means unrelated to said scales for indicating that the machine has been set to perform the special operation.

20. In a machine of the class described, for measuring lengths of fabric drawn from a bolt or roll, the combination of a measuring roller, indicating mechanism driven thereby for indicating the length of a piece of fabric drawn from a bolt or roll, a depressible member, and means operated thereby for actuating the indicating mechanism to indicate the length of a remnant measured on the machine, and means for indicating to the operator of the machine that the said depressible member has been depressed, and the machine set to measure a remnant.

21. In a machine of the class described, for measuring lengths of fabric drawn from a bolt or roll, the combination of a measuring roller, indicating mechanism actuated thereby, a depressible member adapted to be depressed when a remnant is to be measured on the machine, means actuated by said depressible member for increasing the reading of the indicating mechanism and a signal actuated automatically for indicating that the machine is set for measuring a remnant.

In testimony whereof, I have hereunto set my hand.

DOUGLAS TURNER.